United States Patent [19]

Feld

[11] 3,946,293

[45] Mar. 23, 1976

[54] THYRISTOR CONTROL SYSTEM

[75] Inventor: Arnold W. Feld, Mendota, Ill.

[73] Assignee: Conco Inc., Mendota, Ill.

[22] Filed: Sept. 13, 1974

[21] Appl. No.: 505,744

[52] U.S. Cl. ............... 318/227; 318/230; 318/231; 318/314
[51] Int. Cl.² ........................................ H02P 5/40
[58] Field of Search .......... 318/227, 230, 231, 314, 318/318

[56] References Cited
UNITED STATES PATENTS

| | | | |
|---|---|---|---|
| 3,470,447 | 9/1969 | Gyugyi et al. | 318/227 X |
| 3,665,273 | 5/1972 | Enslin | 318/227 |
| 3,703,672 | 11/1972 | Bird et al. | 318/227 |
| 3,816,808 | 6/1974 | Enslin et al. | 318/227 X |

Primary Examiner—Gene Z. Rubinson
Attorney, Agent, or Firm—Wegner, Stellman, McCord, Wiles & Wood

[57] ABSTRACT

An induction motor is coupled to a three-phase AC source through thyristors controlled by a digital control circuit. An adjustable device gates a selected number of clock pulses to a control counter. As one of the AC phases goes positive, the control counter is incremented or decremented by clock pulses until reaching a predetermined count, which causes a trigger means to generate a trigger pulse and fire a thyristor. The trigger pulse also gates clock pulses to a second control counter which counts to 120° and 240° representing numbers in order to fire the other thyristors. In a speed feedback embodiment, rotation of the motor generates a motor feedback signal which is compared with a desired speed signal to adjust the count of an up/down counter, the contents of which are loaded into the control counter.

18 Claims, 4 Drawing Figures

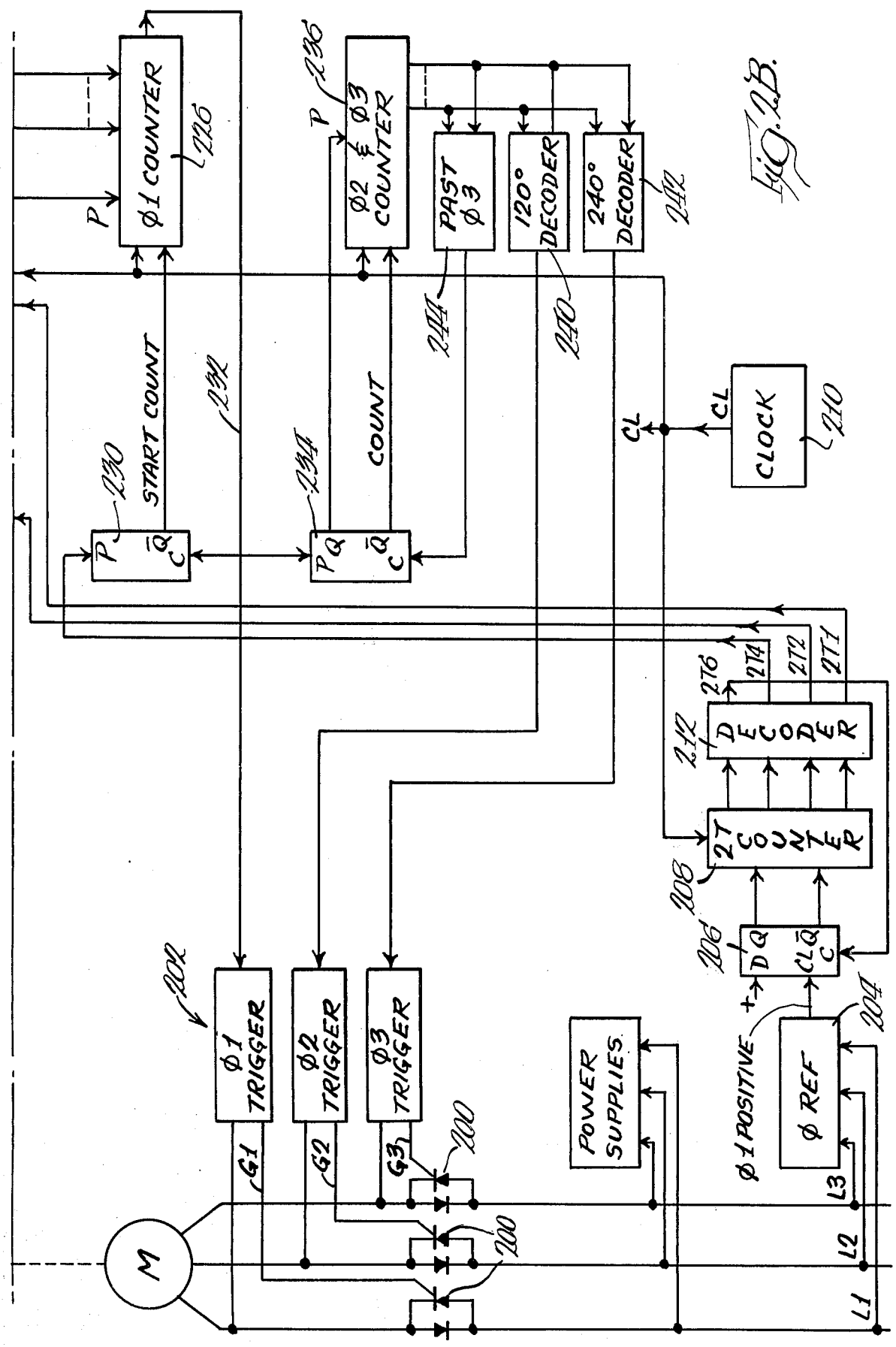

3,946,293

THYRISTOR CONTROL SYSTEM

BACKGROUND OF THE INVENTION

This invention relates to a digital control circuit for thyristors which gate an AC waveform to a load.

Control circuits for triggering a thyristor to gate a selected phase angle of an AC waveform to a load are generally analog in nature. The AC waveform is often integrated to produce a ramp-shaped voltage which triggers the thyristor upon reaching a selected level which corresponds to a desired firing angle. The load is often an induction motor which requires AC drive as opposed to DC drive.

Thyristor control circuits for coupling selected phase angles of an AC waveform to an induction motor have been somewhat digital in nature. Typically, however, clock pulses are integrated to generate analog-type control voltages, or clock pulses are directly gated through the thyristor to a load. Precise control of the thyristor firing angle, by use of primarily digital techniques, has not been satisfactorily accomplished. Furthermore, digital control circuits are difficult to adapt to a motor speed control system in which a transducer monitors the shaft speed of a motor.

SUMMARY OF THE INVENTION

In accordance with the present invention, an improved digital-type control circuit selectively gates a thyristor to pass a selected phase angle of an AC waveform to a load. A control counter is synchronized in operation with the phase of the AC waveform and counts clock pulses so as to provide precise control of the firing angle of the thyristor. In a motor speed control embodiment, rotation of the motor shaft generates motor pulses which cause clock pulses to be counted and compared with a count representing a desired motor speed. Lack of comparison causes correction of a memory stored number, within a maximum limit permitted during one AC cycle. The stored number from the memory is loaded into the control counter to maintain the desired motor speed.

One object of the present invention is the provision of a thyristor control system which controls a thyristor firing angle by a digital counting circuit.

Another object of the present invention is the provision of a motor control system in which thyristors pass AC waveforms under control of digital counters which are synchronized with the phase of the AC waveforms. In one embodiment, the motor control system may be closed loop and generate feedback pulses which are stored and compared with desired speed representing signals to correct the contents of a memory which controls the firing angle of the thyristors.

Other objects and features of the invention will be apparent from the following description and from the drawings. While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

BRIEF DESCRIPTION OF THE DRAWINGS

FIGS. 2A and 2B are a single schematic diagram, which may be joined at the dashed lines, of another embodiment of the thyristor control circuit, as embodied in a closed loop speed control for an AC motor.

OPEN LOOP CONTROL SYSTEM

Figure 1A:
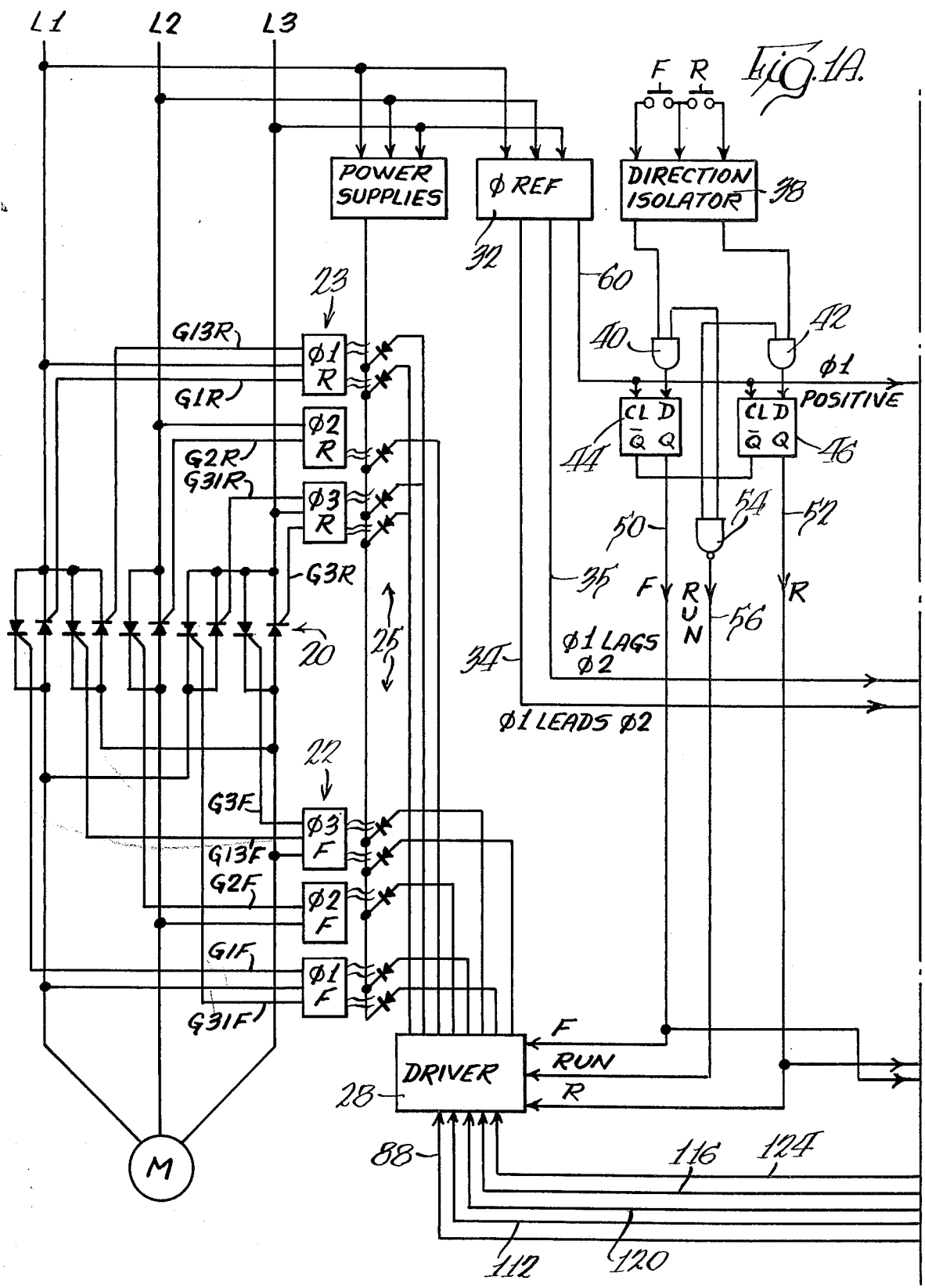
FIGS. 1A and 1B are a single schematic diagram, which may be joined at the dashed lines, of a thyristor control circuit embodied in an open loop torque control for an AC motor.
Figure 1B:
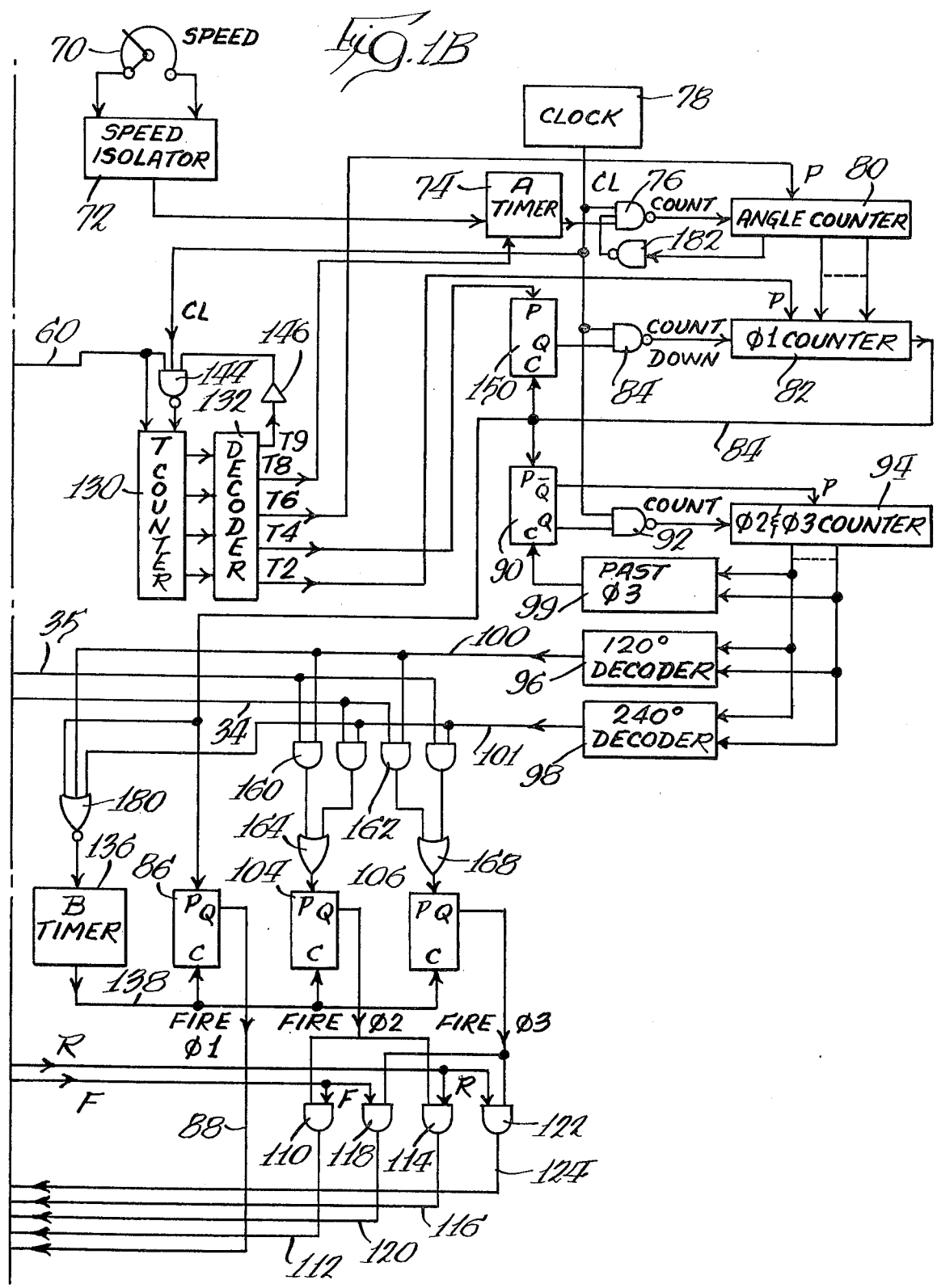

FIGS. 1A and 1B illustrate a single schematic diagram of an open loop torque control for selectively gating portions of three-phase alternating current to a load in the form of an induction motor M. The digital control circuit can be used to gate portions of an AC waveform to AC and DC motors, as well as to any electric load. While gating to a three-phase load has been illustrated, it will be appreciated that gating of only one phase of an AC source could also be controlled using the disclosed techniques. The load is illustratively an induction motor, and hence the thyristors provide open loop speed control by means of line-voltage control. The internal torque developed by an induction motor is proportional to the square of the voltage applied to its primary terminals. As the voltage is decreased, the intersection of the voltage curve with the load curve on the torque-speed characteristic curve of the induction motor will vary, thereby changing the speed of the motor.

The AC motor M can be run in a forward F or reverse R direction, depending on the relative phase and direction of the portions of the AC waveform which are gated to the motor M by a plurality of individually triggerable thyristors 20, which herein take the form of SCRs. The SCRs 20 are coupled to triggering circuits 22 for the forward F direction, and to triggering circuits 23 for the reverse R direction. Each triggering circuit 22, 23 is responsive to signals from corresponding photoelectric isolation diodes 25 to coupled a trigger signal to the gate G of the SCR controlled by the photoelectric diode. A driver circuit 28 has inputs as a forward F or a reverse R direction of rotation signals, a RUN input for enabling the circuit 28, and a plurality of individual trigger lines for the different phases to be enabled. The above described SCR interconnections and trigger means are conventional, and allow not only forward or reverse direction of rotation for the motor, but maintain the desired motor rotation even though the 120° phase angles are switched between the three-phase AC input.

For example, when input line L1 has a phase which leads input line L2, and input line L2 has a phase which leads L3, a phase ($\phi$) reference circuit 32 will generate a 1 bit signal on an output line 34, rather than on an output line 35, which would indicate that $\phi 1$ lags $\phi 2$. The desired direction of rotation for the motor M is selected by actuation of either a forward switch F, or a reverse switch R, which switches are coupled through an isolator 38 to a forward AND gate 40 or a reverse AND gate 42. The forward AND gate 40 is coupled to the D input of a flip-flop 44, and the output of AND gate 42 is coupled to the D input of a flip-flop 46. The Q output of flip-flop 44 forms the forward F line 50 which is an input to driver 28. Similarly, the Q output of flip-flop 46 corresponds to the reverse R line 52 which also forms an input to driver 28. The Q outputs of flip-flops 44 and 46 are coupled to a NAND gate 54, which produces an enabling 1 bit on a line 56 whenever either flip-flop 44 or 46 is set. To set the flip-flops, the CL inputs are both coupled to a $\phi 1$ positive line 60, which has a 1 bit starting when the phase reference circuit 32 determines that $\phi1$ on line L1 has crossed zero and has gone positive, which 1 bit remains for the positive half cycle of $\phi1$. At this time, either flip-flop 44 or 46 can be enabled, and will disable the opposite direction NAND gate 40 or 42.

In all of the drawings, the flip-flops are of the same type, and each has inputs D, CL, P and C, and outputs Q and Q. The unused inputs are not labeled in the drawings, and are tied to ground unless otherwise indicated. A 1 bit at input CL causes the Q output to equal the D input. The P input preclears the flip-flops and causes the Q output to equal a 1 bit. The clear C input resets the flip-flop, and causes the Q output to equal a 0 bit.

Thus, the forward and reverse flip-flops 44 and 46 will clear once each cycle of alternating current of $\phi1$, and will have a 1 bit output only so long as a 1 bit is present at the D input when $\phi1$ goes positive. Upon release of switch F, for example, the AND gate 40 will have 0 bit and therefore the previously set flip-flop 44 will reset as CL goes to a 1 bit, producing a 1 bit at the Q output. If AND gate 42 should not have a 1 bit at its other input, due to closure of the R switch, then NAND gate 54 generates a 0 bit on line 56 and the driver 28 is disabled to stop the motor. The SCRs 20 are connected to the gate trigger lines G so as to gate the AC waveform to the motor in a sequence in which the gated leading phase is then followed by the next leading phase to rotate the motor M in the forward direction. For a reverse direction of rotation, the sequence of triggering is reversed. Should the phase relationship change on the input lines L1, L2 and L3, then the triggering sequence will again be flipped, so that the proper phase sequence is coupled to the motor M, as is conventional.

Digital control over the firing angles of the SCRs 20 is accomplished by the circuit illustrated in FIG. 1B. A desired speed of rotation for the motor M is selected by an adjustable device such as a potentiometer 70 which is coupled through a speed isolator 72 to a rheostat controlled timer 74 labeled A. When the A timer 74 is enabled by a timing pulse T8, the output line has a 1 bit for a duration of time controlled by the wiper setting of the potentiometer 70. As will be explained, the time duration allows a NAND gate 76 to pass clock pulses CL, from a crystal oscillator or clock 78, to an angle counter 80. The number of pulses counted by counter 80 will be directly dependent on the time duration of the 1 bit output from timer 74, which in turn is directly dependent on the wiper setting of the potentiometer 70.

At a later time, the contents of the angle counter 80 will be transferred to a control counter 82, after which the control counter 82 will be decremented by clock pulses CL coupled to a NAND gate 84 until a zero count is reached. At this time, the output line 84 from counter 82 will have a 1 bit which sets a flip-flop 86, creating a 1 bit on its Q output line 88, which corresponds to a trigger input to the driver 28. This triggers the SCR 20 which is appropriate for the phase sequence and direction of rotation for the motor. A timer 136, labeled B, is a monostable multivibrator and generates a 1 bit on a clear line 138 a short time after flip-flop 86 is set.

The 1 bit on line 84 also sets a flip-flop 90, allowing a NAND gate 92 to pass clock pulses CL to a $\phi2$ and $\phi3$ control counter 94. The output lines of control counter 94 are coupled to a 120° decoder 96 and a 240° decoder 98. The clock 78 has an accurate fixed frequency, such as 100 KHz, so that a specified number of clock pulses and hence count in the counter 94 will represent the lapse of 120° and 240° of one AC cycle of the 60 Hz three-phase source. Decoder 96 determines when this 120° representing count is reached, and generates a 1 bit on an output line 100 which sets either a flip-flop 104 or a flip-flop 106, depending on whether $\phi1$ is lagging $\phi2$ or leading $\phi2$. The setting of flip-flop 104 enables an AND gate 110 and produces a 1 bit on a line 112 if the motor is to rotate in the forward F direction, or enables an AND gate 114 to produce a 1 bit on an output line 116 if the motor is to rotate in the reverse R direction. In a similar manner, flip-flop 106 will enable an AND gate 118 to produce a 1 bit on its output line 120 if the motor is to rotate in the forward F direction, or will enable an AND gate 122 to produce a 1 bit on its output line 124 if the motor is to rotate in the reverse R direction. The B timer 136 is also set when flip-flops 104 and 106 are set, to clear the flip-flops after the trigger signal is generated.

Timing pulses for controlling the sequence of operation of the circuit are produced by a timing T counter 130 which counts clock pulses CL. The counter 130 is binary and has its binary output lines coupled to a binary-to-digital decoder 132 which produces on corresponding digital output lines a timing pulse T when the counter 130 has counted the corresponding digital number which follows the T designations. Thus, line T2 is enabled upon counting two clock pulses CL, line T4 is enabled upon counting of four clock pulses CL, and so forth.

Considering in more detail the operation of the digital thyristor control circuit, it will be assumed that motor M is not rotating and that the potentiometer 70 has been manipulated to a desired speed setting. It also will be assumed that the forward F switch has been depressed so that lines 50 and 56 have 1 bit outputs. At this time, the counters 80, 82, 84 and 130 are in a cleared state, with no count or number stored therein.

As $\phi1$ goes positive, a 1 bit appears on line 60 and is coupled to a NAND gate 144. Since counter 130 is in a zero count, T9 has a 0 bit output, which is inverted by a NOT gate 146 to produce a 1 bit input to NAND gate 144. As a clock pulse CL appears, all the 1 bit inputs cause NAND gate 144 to generate an enabling 0 bit which is counted by the binary counter 130. Each successive clock pulse CL is counted, and produces corresponding T outputs at the labeled time, until the ninth pulse is counted to produce an output T9. This is inverted by NOT gate 146 to produce a 0 bit input to NAND gate 144, blocking the gate and preventing further CL pulses from being counted. Because the clock time is greatly in excess of the AC frequency, and the entire counting sequence to T9 occurs during an insignificant angle change in phase of the AC power signal. After a 180° AC phase change, $\phi1$ goes negative, and line 60 resets the counter 130, producing a zero count which causes decoder 132 to have its output T0, which is not utilized and is not illustrated.

As the counter 130 begins its cycle, the second clock pulse generates output T2 which preclears control counter 82 to its zero count or state. Upon time T4, a flip-flop 150 is set, producing a 1 bit on a Q line and enabling the NAND gate 84 to pass clock pulses CL which decrement the counter 82. However, since counter 82 now has a zero count stored therein, an output 1 bit is immediately generated on line 84, setting flip-flop 86 and generating a fire $\phi 1$ output on line 88. This immediately triggers the appropriate SCR 20 to pass the maximum portion of AC to the motor, beginning rotation of the motor.

The 1 bit on line 84 also produces a 1 bit on the Q output of a flip-flop 90, allowing NAND gate 92 to pass clock pulses CL, in the form of 0 bits, to control counter 94 which proceeds to count the clock pulses. After the occurrence of a number of clock pulses, selected to equal the lapse of 120° AC, the resulting output number is detected by decoder 96 to generate a trigger signal on line 100. This sends a 1 bit to an AND gate 160 and to an AND gate 162. If the AC waveform $\phi 1$ lags $\phi 2$, then line 35 has a 1 bit which now enables AND gate 160 to pass a 1 bit to an OR gate 164, passing an enabling 1 bit to flip-flop 104 in order to produce a fire $\phi 2$ signal. Alternatively, if the AC waveform $\phi 1$ leads $\phi 2$, line 34 enables AND gate 162 which now passes a 1 bit to an OR gate 168 for setting of flip-flop 106.

When counter 94 reaches a 240° representing count, decoder 98 passes a 1 bit to AND gates which enable the OR gate 164 or 168 which was previously not enabled. After the $\phi 2$ and $\phi 3$ counter 94 steps beyond the count which actuates 240° decoder 98, a past $\phi 3$ decoder 99 is enabled, producing the signal which clears flip-flop 90. The Q output of flip-flop 90 goes to a 0 bit, blocking the NAND gate 92, and the Q output goes to a 1 bit, clearing counter 94 in anticipation of the next sequence of operation.

Shortly after each of the flip-flops 86, 104 or 106 is set, the B timer 136 times out and enables line 138 to generate a clear signal which resets the flip-flop. For this purpose, the trigger producing lines 84, 100 and 101, are each coupled to a NOR gate 180 which produces a 0 bit which triggers timer 136. Of course, the above-described operations occur over 240° of the AC waveform.

Returning to the timing sequence, generation of timing pulse T6 presets the angle counter 80 to a clear condition. Upon time T8, the timer 74 is enabled to generate a timing output pulse having a duration dependent on the setting of potentiometer 76. This generates a 1 bit input to NAND gate 76, which also has a one input from a NAND gate 182. As each clock pulse CL appears, an enabling 0 bit is counted by the counter 80 until the timer 74 times out and thereby blocks NAND gate 76. The first clock pulse to be counted by counter 80 occurs simultaneously with the stepping of counter 130 to the T9 state, which generates a 0 bit to NAND 144 and disables the counter 130. The angle counter 80 will complete its count before the $\phi 1$ signal goes negative, at which time counter 130 is cleared. This terminates the T9 pulse and allows the counter 130 to be ready for the next positive going half of the AC cycle.

The NAND gate 182 may be coupled to the last stage of the counter 80, to prevent a count from being entered which is greater than the capacity of the counter 80. Thus, should the counter 80 count up to its maximum number, prior to the timing pulse from timer 74 terminating, a 0 bit output from NAND 182 will disable NAND gate 76 to prevent the counter from attempting a higher count. At all other times when the counter is not set to its maximum number, NAND gate 192 has a 1 bit output. In practice, NAND gate 192 may have a plurality of inputs coupled to all stages of the counter 80, so as to decode the presence of all 1 bits which would represent the highest binary number.

Upon $\phi 1$ again going positive, counter 130 is enabled as previously described, and begins to count clock pulses. The T2 pulse enables the P or load input of counter 82, causing the contents of the angle counter 80 to be loaded into the control counter 82. As the T2 pulse disappears, the load input is terminated and control counter 82 now contains a count representing the desired motor speed. Upon the T4 pulse, the flip-flop 150 is set and the counter 82 is decremented towards a zero count. Upon reaching a zero count, which generally will be many clock pulses later, the output signal on line 84 will again cause firing of the SCR associated with $\phi 1$. Upon the occurrence of a T6 pulse, the angle counter 80 will be precleared to its zero state, and upon the T8 pulse, the A timer 74 will again be enabled so as to cause clock pulses to pass to the counter 80. It will be appreciated that the operator can change the speed setting of potentiometer 70 at any time. The changed setting will take effect upon the next counting of the angle counter 80 at the T6 time.

The digital operation of the counters is synchronized to the phase of alternating current, through synchronization of the counter 130 with a predetermined phase relationship, herein being zero cross-over of the alternating current. Because the frequency of the clock 78 is many orders of magnitude greater than the frequency of the AC source, the counter 130 completes its counting cycle of nine clock pulses during an insignificant portion of the rise time of $\phi 1$. Thus, counter 82 which is enabled after four clock pulses, in effect is enabled at the zero crossing of the $\phi 1$ power waveform.

CLOSED LOOP CONTROL SYSTEM

Figure 2A:
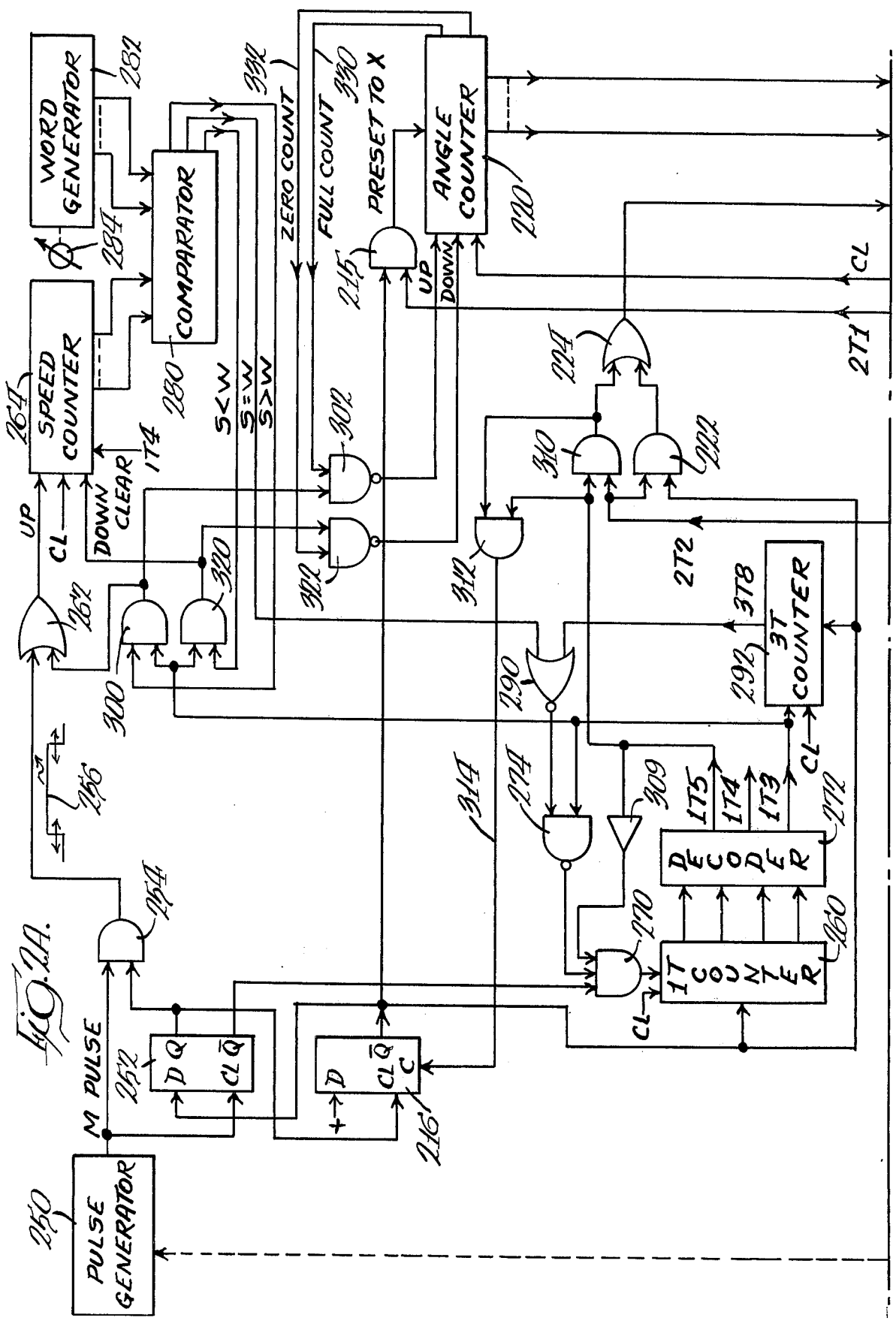

In FIGS. 2A and 2B, a single schematic diagram is illustrated for closed loop speed control of the induction motor M. Similar named parts of the digital control circuit, which controls the firing angle of the thyristors, are generally similar to FIG. 1B, and will be described briefly. Unlike FIG. 1B, however, the contents of the angle counter is not constant, but varies in accordance with the speed feedback information.

As seen in FIG. 2B, three thyristors 200, in the form of SCRs, are coupled to corresponding phase trigger circuits 202. Each SCR 200 is shunted by a diode which passes the opposite half cycle of the AC waveform. Thus, line-voltage control of the induction motor M is accomplished by controlling only one-half cycle of the AC waveform passed to the motor.

As $\phi 1$ goes positive, a phase reference detector 204 generates a signal which sets a flip-flop 206, producing an output which enables a counter 208, herein labeled 2T. The 2T counter 208 begins to count clock pulses CL from a clock oscillator 210, having a frequency such as 100 KHz. A binary-to-digital decoder 212 is responsive to the 2T counter to produce 2T timing pulses. Pulse 2T1 is coupled to an AND gate 215, FIG. 2A, having its other input coupled to a flip-flop 216 which has at this time a 1 bit on output Q. Therefore, the 2T1 pulse is coupled to a memory or angle counter 220, causing it to be preset to a count or number X which is selected to initiate rotation of the motor when it is not moving. Thus, the number X preset in the angle counter 220 would be some value, as 25% of a number producing maximum motor rotation, in order to provide an initial firing angle to overcome friction and other forces.

At time 2T2, AND gate 222 receives a 1 bit, which has a 1 bit on its other input from the same Q output of flip-flop 216. The AND gate 222, which is used only to load the artificial number X when the motor is at rest or has been stalled, generates a 1 bit which is passed through an OR gate 224 to the load input of a $\phi 1$ control counter 226. The number or count X in angle counter 220 is now stored in the $\phi 1$ counter 226.

At 2T4 time, the P input of a flip-flop 230 receives a 1 bit, causing the Q output to go to a 0 bit and thereby enable the $\phi 1$ counter 226 to count clock pulses. Unlike the $\phi 1$ counter 82 in FIG. 1B, which counted down towards zero, the $\phi 1$ counter 226 counts up to its maximum value. Upon reaching the maximum count, the last stage generates a 1 bit over an output line 232 which is coupled to the $\phi 1$ trigger stage 202 in order to enable the SCR 200 coupled to gate G1. At the same time, the 1 bit on line 232 is coupled to the C input of flip-flop 230, resetting the flip-flop and thereby terminating 0 bit signal on Q which had enabled the $\phi 1$ counter 226. Also, the 1 bit on line 232 is coupled to the P input of a flip-flop 234, producing a 0 bit at the Q output, which enables a $\phi 2$ and $\phi 3$ control counter 236. The control counter 236 now counts clock pulses and, upon detection by a detector 240 of a 120° representing count, generates a 1 bit which enables the $\phi 2$ trigger 202. Similarly, upon detection of a 240° representing count, a decoder 242 generates a 1 bit which triggers the $\phi 3$ SCR. Upon counting past 240°, a past $\phi 3$ decoder 244 generates a 1 bit which clears the flip-flop 234, terminating the 0 bit enabling signal to the counter 236. At the same time, the Q output of flip-flop 234 goes to a 1 bit and preclears the counter 236 to its zero state.

Two clock pulses after counter 226 had begun counting, the counter 208 would generate an output 2T6 which will clear flip-flop 206. This clears the counter 208 to its 2T0 state (which is not utilized nor illustrated).

The 1 bit output from counter 226 causes motor M to begin to rotate due to the preset firing angle, and such rotation enables the speed feedback circuit, shown in FIG. 2A. It will be appreciated that the $\phi 1$ counter 226, the $\phi 2$ and $\phi 3$ counter 236, and their associated circuits operate generally the same as the counters 82 and 94 and associated circuits previously described for FIG. 1B.

Rotation of inductor motor M causes a connected pulse generator 250 to produce motor M pulses dependent on the speed of rotation of the motor. The number of M pulses produced per revolution of motor M is constant, and therefore the pulse duration shortens as motor speed increases. Pulse generator 250 is conventional and may, for example, comprise a rotating wheel having windows which pass a photoelectric detector. The generator 250 is selected so that one M pulse is of a time duration greatly in excess of the time duration of the clock pulses CL, so that hundreds or thousands of clock pulses CL will occur during the shortest M pulse (which presents the fastest motor speed).

The FIG. 2A circuit samples only the first M pulse to produce a speed feedback signal, and does not utilize another M pulse for speed feedback control until the next cycle of the $\phi 1$ waveform. In particular, the leading edge of the first M pulse produces a 1 bit at the cL input of a flip-flop 252. At this time, flip-flop 216 has a 1 bit on its Q output, coupling a 1 bit to the D input of flip-flop 252. Therefore, the leading edge of the M pulse causes a 1 bit at the Q output of flip-flop 252, enabling an AND gate 254 which now passes the remaining portions 256 of the M pulse, which has a duration inversely proportional to motor speed. Because of the relatively long duration of the M pulse, motor pulse 256 can be considered as the M pulse itself. The 1 bit at the Q output of flip-flop 252 also causes the Q output of flip-flop 216 to have a 0 bit, disabling the AND gate 215, the AND gate 222, and clearing a 1T counter 260. The 0 bit is also coupled to the D input of flip-flop 252. The flip-flop 216 now remains in this state until a complete cycle of $\phi 1$ has occurred.

The motor pulse 256 passed by AND gate 254 is coupled through an OR gate 262 and enables an up count input of a speed counter 264. The counter 264 now increments under control of clock pulses CL until the motor pulse 256 terminates. The count stored in counter 264 now corresponds to the pulse duration of the motor pulse 256 and hence to the M pulse. When motor speed is slow, as during initial energization of the motor, the motor pulse 256 has a long duration and the speed counter 264 will contain a very high count which may equal its maximum count. As will be explained, the speed counter 264 is cleared during every 360° of $\phi 1$, and then recounts clock pulses corresponding to the next sampled motor pulse. As motor speed increases, the counter 264 will contain smaller numbers.

Returning to the initial starting conditions, as the second M pulse occurs, it will be recalled that the D input of flip-flop 252 now contains a 0 bit. Hence the second M pulse at input CL will cause the Q output of flip-flop 252 to equal a 0 bit, and the Q output to equal a 1 bit. The 0 bit from the Q output disables AND gate 254, preventing the M pulse from passing to the speed counter 264. The 0 bit also is coupled to the CL input of flip-flop 216, preventing flip-flop 216 from changing state until the angle counter 220 is utilized, as will appear.

The 1 bit now on the Q output of flip-flop 252 initiates a 1T timing cycle in order to utilize the inverse speed representing number stored in the speed counter 264. In particular, the 1 bit is coupled to an AND gate 270, the other inputs of which are 1 bits at this time. This produces a 1 bit output which enables the 1T counter 260, causing it to count clock pulses CL. A binary-to-digital decoder 272 now produces 1T timing pulses which are stepped by the clock pulses CL. Upon the occurrence of the third clock pulse, an output 1T3 is coupled to a NAND gate 274, the other input of which is a 1 bit at this time. The pair of 1 bits produce a 0 bit which causes AND gate 270 to generate a 0 bit which disables the 1T counter. The 1T3 pulse is now held for the next eight clock pulses, or until a match occurs which indicates that motor speed is almost at a desired preselected speed. During the held 1T3 pulse, utilization is made of the speed feedback number in memory or counter 264, and a determination is made whether the sampled speed of the motor is sufficiently close to a preselected speed so that a fine adjustment can be made to the phase angle to exactly coincide the actual speed with the commanded speed.

More particularly, the inverse speed representing number in memory 264 is coupled to a comparator 280 which also receives a commanded speed representing binary words from a word generator 282. A manual adjustment 284 allows different binary words to be generated, each word composed of plural binary bits representing a desired motor speed, following the same format as the numbers stored in counter 264. That is, the count produced in counter 264 when a particular speed is sampled is the same count as produced by the word generator 282 when that same motor speed is desired. The comparator 280 continuously compares the binary word from counter 264 with the binary word from woed generator 282, produces one of three outputs. If the binary word from speed (S) counter 264 is less than the binary word from word (W) generator 282, a S W output is produced. If the converse is true, S<W output is produced. When the two binary numbers match, a S=W output is produced. Because the binary word in memory 264 represents the motor speed, an output S<W indicates that motor speed is too fast. conversely, if S is greater than W, then motor speed is too slow, and the firing angle must be increased.

The S=W output is coupled to a NOR gate 290, and the presence of a 1 bit will allow the 1T counter to continue counting. The held 1T3 output also enables a T3 counter 292, allowing it to count clock pulses CL. Upon the occurrence of the eighth clock pulse, a 3T8 pulse is generated which is coupled to the NOR gate 290. The presence of a 1 bit at either input of NOR gate 290 causes the NOR gate to generate a 0 bit. This causes NAND gate 274 to generate a 1 bit output coupled to AND gate 270. The presence of all three 1 bits now reenables the 1T counter, allowing it to continue beyond the 1T3 time. When a 1 bit is not present on either input line of NOR gate 290, it generates a 1 bit output to NAND gate 274, which is the means which allows the NAND gate to disable the 1T counter upon initial receipt of the 1T3 pulse.

During the held 1T3 pulse, the count of the memory or angle counter 220 is adjusted upwards or downward to correspond with whether increased or decreased power is to be passed to the motor. The maximum adjustment premitted during one AC cycle is that which corresponds to eight counted pulses. Since the motor in the present example has just begun rotation, it will be assumed that its speed does not equal the desired speed from generator 282. Therefore, the comparator 280 produces a 1 bit output S>W which is coupled to an AND gate 300. The other input to gate 300 at this time is the 1 bit produced by the held 1T3 pulse. Therefore, AND gate 300 generates a 1 bit output which is coupled through OR gate 262 to enable the up control input of counter 264. At the same time, the 1 bit from AND gate 300 is coupled to a NAND gate 302, the other input of which is a 1 bit at this time. This produces a 0 bit output which enables a count up control input of the angle counter 220. Thus, the count up control inputs of counters 264 and 220 are enabled at the same time, and both counters increment for each clock pulse CL. If the motor speed is not near the desired speed, then the eight count increase in counter 264 will not produce a match from comparator 280. Therefore, the S>W output continues, and both counters 264 and 220 count eight clock pulses CL.

Upon counting of the eight pulses, the 3T counter 298 produces an output 3T8 which enables the 1T counter so that the next clock pulse CL terminates the 1T3 output and produces a 1T4 output. When output 1T3 is terminated, AND gate 300 is blocked to remove the up enabling inputs to counters 264 and 220. Thus, the contents of these counters 264 and 220 are now held during the remaining portion of the 1T clock cycle.

The 1T4 pulse clears counter 264 so that it can receive a new inverse speed indicating count during the next AC cycle. The next clock pulse CL produces a 1T5 output which couples a 1 bit to AND gate 310 and to an AND gate 312. Pulse 1T5 is now held because a NOT gate 309 produces a disabling 0 bit to AND gate 270, preventing the 1T counter from further counting clock pulses. The 1T5 pulse therefore remains at AND gate 310 until generation of a 2T2 pulse which occurs shortly after $\phi 1$ goes positive, thus synchronizing use of the memory counters to the phase of the AC. At time 2T2 after phase cross-over, AND gate 310 has 1 bits at both inputs, thereby loading the $\phi 1$ counter 226 with the contents of the angle counters. The AND gate 312 also resets flip-flop 216 thereby generating a 1 bit on the Q output. However, this 1 bit cannot enable AND gate 215, since it was reset at time 2T2, which occurred after the 2T1 pulse. Thus, as long as an M pulse is generated during one cycle of the alternating current, the the angle counter 220 will retain the previously loaded count, which will then be incremented or decremented as controlled by the comparator 280, and coupled to the control counter 220. If the motor should stall, then no M pulse would be generated during one complete AC cycle. Therefore, the Q output of flip-flop 216 would have a 1 bit at the same time as the 2T1 pulse occurred, enabling AND gate 215 is load angle counter 220 with number X, as occurred when the motor was initially energized. Upon loading of the angle counter and generation of a 1 bit on line 314, it should be noted that the Q output of flip-flop 216 goes to a 1 bit and thereby clears the 1T counter 260, terminating the held 1T5 pulse, and also clears counters 292. It also provides a 1 bit to the D input of flip-flop 252 to allow a new M pulse to be sampled.

Returning to the $\phi 1$ counter 226, the loading produced by the OR gate 224 now allows the previously described SCR triggering operation to occur. Namely, the $\phi 1$ counter which has a larger number, due to incrementing of angle counter 220, will be incremented at 2T4 time, and the larger number will cause control counter 226 to reach its maximum count sooner. This will cause the firing signal on line 232 to occur sooner, representing an increased firing angle and increased power passed to the $\phi 1$ SCR. This in turn will increase the speed of the motor.

It will next be assumed that the motor speed has increased slightly greater than the desired speed, but is very close to the desired speed. The sampled M pulse passed by AND gate 254 enables the speed counter 264 to again count up to the inverse speed representing feedback number. This will now cause an output S<W. At time 1T3, an AND gate 320 will be enabled rather than the AND gate 300. This generates a 1 bit to a count down enabling line of counter 264, and to a NAND gate 322 which has a 1 bit on the other input thereof. The resulting 0 bit output enables a count down input of angle counter 220, now allowing both counters 264 and 220 to decrement. Assuming that the sensed speed is within eight counts of the desired speed, both counters will decrement until comparator 280 switches its output from S<W to S=W.

The S=W signal now terminates the enabling signal to AND gate 320, preventing speed counter 264 from being further decremented. In turn, this also disables the count down input of angle counter 220, causing it to hold its count (which now equals the firing angle which should produce the desired speed). The S=W output causes a 0 bit output to be produced from NOR gate 290, thereby reenabling the 1T counter. The 1T4 output will now clear counter 264, and the held 1T5 output will, upon the next AC cross-over, load the contents of the angle counter 220 in the $\phi 1$ counter 226. Thus, the resulting firing angle should now produce an actual speed equal to the desired speed. If this is the case, the next inverse speed count in speed counter 264 will equal the number from the word generator 282. The S=W output will prevent the angle counter 220 from being changed at the next time 1T3, and thus the same firing angle will be maintained in order to maintain the same speed of the motor. In practical systems, the firing angle will fluctuate slightly due to slight speed variations which will evidently occur, but essentially the same firing angle will be maintained. When conditions change, such as a change in the load connected to the motor M, the speed of the motor will vary from the desired speed, and the feedback system will now be operative to change the firing angle until the sensed speed equals the desired speed.

The angle counter 220 should not be varied beyond its full count or its zero count. A full count line 330 has a 1 bit thereon except when the counter is incremented to its full count. At full count, a 0 bit is generated which will prevent NAND gate 302 from passing an enabling 0 bit to the count up input of counter 220. Similarly, a zero count line 332 has a 1 bit thereon except when the count of counter 220 is zero. At such time, the 0 bit on line 332 will prevent NAND gate 322 from enabling the count down line of the counter 220.

The angle counter 220 and the $\phi 1$ counter 226 are synchronized to the phase of the alternating current by operation of the 2T counter. The sampled motor speed is compared with the desired motor speed to adjust the previous count of the angle counter by operation of the 1T and 3T counters. Also, since the corrections which can be made during the increment and decrement cycle time of the counters is limited to eight count, sudden changes in firing angle are prevented to minimize overshoot and undershoot.

I claim:

1. A control circuit for gating a predetermined portion of each cycle of an AC waveform from an AC source to a load, comprising:
   a thyristor coupled between the AC source and the load and triggerable to pass portions of the AC waveform to the load;
   a clock for generating clock pulses;
   counter means for counting the clock pulses until reaching an angle count representing a firing phase angle which forms the start of the predetermined portion of the AC waveform;
   synchronizing means coupled to the AC source for effectively synchronizing the count of the counter means with a reference phase angle of the AC waveform; and
   trigger means coupled to the counter means for triggering the thyristor in response to the occurrence of the angle count.

2. The control circuit of claim 1 wherein the synchronizing means comprises a detector for generating a reference signal when the AC waveform has the reference phase angle, and gate means coupled between the clock and the counter means for passing clock pulses to the counter means upon receipt of the reference signal to thereby effectively synchronize the count with the reference phase angle.

3. A control circuit for gating portions of an AC waveform from an AC source to a load, comprising:
   a thyristor coupled between the AC source and the load and triggerable to pass portions of the AC waveform to the load;
   a clock for generating clock pulses;
   a first counter means for counting the clock pulses to vary the count in proportion to the number of clock pulses coupled to the first counter means;
   a detector coupled to the AC source for generating a reference signal when the AC waveform has a predetermined phase angle, and gate means coupled between the clock and the first counter means for passing clock pulses to the first counter means upon receipt of the reference signal to thereby effectively synchronize the count of the first counter means with the predetermined phase angle;
   a second counter means connectable to the clock for counting the clock pulses to vary an angle count in proportion to the number of received clock pulses, means for gating the second counter means to the clock for a time period representing a desired phase angle which is to be passed by the thyristor to the load, and means effective after termination of the time period for transferring the angle count of the second counter means to the first named counter means to set the first counter means to the angle count representing the desired phase angle; and
   trigger means coupled to the first counter means for triggering the thyristor in response to the occurrence of a predetermined count.

4. The control circuit of claim 3 wherein the load comprises a motor having a feedback sensor responsive to rotation of the motor for generating motor pulses, sampling means for gating the clock pulses to a memory for a time period proportional to the motor pulse duration to cause the count of the memory to represent actual motor speed, means for generating a desired speed signal, and comparator means responsive to the count of the memory and the desired speed signal for altering the angle count of the second counter means.

5. A control circuit for gating portions of AC waveforms to a load from a three-phase AC source with three power lines each having thereon an AC waveform phase shifted by a fixed phase angle with respect to the AC waveforms on the remaining power lines, comprising:
   at least three thyristors each coupled between a different one of the power lines and the load and triggerable to pass portions of the AC waveforms to the load;
   a clock for generating clock pulses;
   counter means for counting the clock pulses to vary the count in proportion to the number of clock pulses coupled to the counter means;
   synchronizing means coupled to the AC source for effectively synchronizing the count of the counter means with a predetermined phase angle of the AC waveform;
   a first trigger control responsive to the occurrence of a predetermined count for triggering one of the thyristors; and
   a second trigger control including a counter coupled to the clock in response to triggering of the one thyristor for counting to a fixed phase angle representing number which triggers the second thyristor.

6. The control circuit of claim 5 wherein the second trigger control includes a first decoder coupled to the counter for detecting a number corresponding to the fixed phase angle in order to trigger the second thyristor and a second decoder coupled to the counter for detecting a number corresponding to two fixed phase angles in order to trigger the third thyristor.

7. A control circuit for gating portions of an AC waveform from an AC source to a load which produces an output variable in relation to the amount of the AC waveform gated thereto, comprising:
- a thyristor coupled between the AC source and the load and triggerable to pass portions of the AC waveform to the load;
- memory means for storing a number which represents the phase angle of the AC waveform which is to be gated to the load;
- trigger means responsive to the memory means for triggering the thyristor when the AC waveform has a phase angle corresponding to the number stored in the memory means;
- feedback means responsive to the variable output for producing a corresponding feedback signal; and
- correction means responsive to the feedback signal for changing the number stored in the memory means to to maintain a fixed output from the load.

8. The control circuit of claim 7 including a clock for generating clock pulses, the memory means comprises a memory counter responsive to the clock pulses for changing the number in proportion to the number of received clock pulses, and the correction means includes a gate actuable to couple the clock to the memory counter in order to change the number.

9. The control circuit of claim 7 wherein the feedback means generates a plurality of feedback pulses during each cycle of the AC waveform, and sampling means for sampling only one feedback pulse during a predetermined phase period of the AC waveform.

10. A control circuit for gating portions of an AC waveform from an AC source to a load which produces an output variable in relation to the amount of the AC waveform gated thereto, comprising:
- a thyristor coupled between the AC source and the load and triggerable to pass portions of the AC waveform to the load;
- a clock for generating clock pulses;
- a memory counter responsive to the clock pulses for changing a number which represents the phase angle of the AC waveform which is to be gated to the load in proportion to the number of received clock pulses, a clock input coupled through a gate to the clock for changing the number when the gate is actuated, an up control input for causing the memory counter to increment the number in response to clock pulses at the clock input, a down control input for causing the memory counter to decrement the number in response to control pulses at the clock input;
- trigger means responsive to the memory counter for triggering the thyristor when the AC waveform has a phase angle corresponding to the number stored in the memory means;
- feedback means responsive to the variable output for producing a corresponding feedback signal;
- reference means for producing a reference signal representing a fixed output desired from the load; and
- correction means including the gate for coupling the clock to the memory counter in order to change the number stored in the memory means to thereby maintain a fixed output from the load and a comparator coupled to the feedback means and the reference means for comparing the feedback signal with the reference signal to activate the up control input or the down control input of the memory counter when the signals do not match.

11. The control circuit of claim 10 including a timing counter responsive when clock pulses are being gated to the memory counter for counting clock pulses up to a predetermined number, and means responsive to the timing counter reaching the predetermined number for disabling the gate to thereby limit the amount of phase angle change which an be produced during a predetermined period.

12. A control circuit for gating portions of an AC waveform from an AC source to a load which produces an output variable in relation to the amount of the AC waveform gated thereto, comprising:
- a thyristor coupled between the AC source and the load and triggerable to pass portions of the AC waveform to the load;
- memory means for storing a number which represents the phase angle of the AC waveform which is to be gated to the load;
- a clock for generating clock pulses;
- trigger means responsive to the memory means for triggering the thyristor when the AC waveform has a phase angle corresponding to the number stored in the memory means including a counter for counting the clock pulses, means to preset the number stored in the memory means in the counter, means coupled to the counter for triggering the thyristor in response to reaching a predetermined count, and synchronizing means coupled to the AC source and responsive to the occurrence of a predetermined phase angle of the AC waveform for enabling the counter to count towards the predetermined count;
- feedback means responsive to the variable output for producing a corresponding feedback signal; and
- correction means responsive to the feedback signal for changing the number stored in the memory means to maintain a fixed output from the load.

13. The control circuit of claim 12 including a second thyristor coupled between the AC source and the load and triggerable to pass portions of the AC waveform to the load, a second counter for counting clock pulses, means responsive to when the first-named counter reaches the predetermined count for coupling the clock to the second counter, and decoder means coupled to the second counter for triggering the second thyristor in response to the occurrence of a preselected count.

14. A control circuit for gating to a motor portions of phase shifted AC waveforms on three lines of a three-phase AC source, comprising:
- at least three thyristors each coupled between a different one of the three lines and the motor, each being triggerable to pass portions of the corresponding phase shifted AC waveform to the motor;
- a clock for generating clock pulses;
- counter means for counting the clock pulses to vary its count in proportion to the number of received clock pulses;

means for loading the counter means with an initial count which represents a preselected phase angle of the AC waveform which is to be initially gated to the motor;

gate means coupled between the clock and counter means and responsive to a predetermined phase relationship of one of the AC waveforms for passing clock pulses to the counter means;

first trigger means coupled to the counter means for triggering one of the thyristors when the counter means reaches a predetermined count; and second trigger means responsive after triggering of the one thyristor for triggering the second and third thyristors at phase angles which correspond to the phase angle passed by the one thyristor.

15. The control circuit of claim 14 wherein the second trigger means includes a second counter means for counting the clock pulses, a second gate for coupling the clock to the second counter means when the first trigger means triggers the one thyristor, and decoder means responsive to preselected counts of the second counter means which correspond to said phase angles for triggering the second and third thyristors.

16. The control circuit of claim 14 including feedback means coupled to the motor for generating a feedback signal, a generator for generating a desired reference signal, a comparator responsive to the feedback signal and the desired reference signal for indicating a deviation, and correction means responsive to an indicated deviation for changing the initial count set by the loading means.

17. A control circuit of claim 16 including an angle counter for counting the clock pulses, the comparator produces up count and down count control signals coupled to the angle counter for controlling the direction of count, second gate means for connecting the clock to the angle counter, and transfer means responsive when the second gate means is disabled for loading the first-named counter means with the count stored in the angle counter.

18. A control circuit of claim 17 including timing means coupled to the clock for generating timing pulses, and a timing counter responsive to the timing pulses for limiting the period of operation of the second gate.

* * * * *